Figure 1:
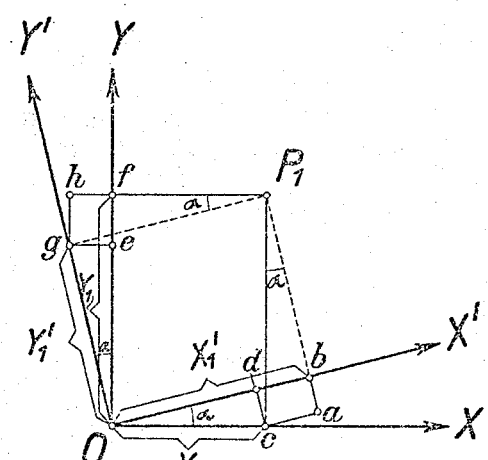

May 31, 1932.    W. SANDER    1,861,192
COORDINATE TRANSFORMER
Filed April 5, 1930    2 Sheets-Sheet 1

Inventor:

May 31, 1932.   W. SANDER   1,861,192
COORDINATE TRANSFORMER
Filed April 5, 1930   2 Sheets-Sheet 2

Inventor:
Willy Sander

Patented May 31, 1932

1,861,192

UNITED STATES PATENT OFFICE

WILLY SANDER, OF JENA, GERMANY, ASSIGNOR TO THE FIRM OF CARL ZEISS, OF JENA, GERMANY

COORDINATE TRANSFORMER

Application filed April 5, 1930, Serial No. 441,996, and in Germany April 9, 1929.

The subject of the invention is to provide a device for finding by means of the co-ordinates of points of a two or a three dimensional object, which relate to a plane or spatial system of rectangular co-ordinates, those co-ordinates of the said points which relate to another system of rectangular co-ordinates turned relatively to the said first system of co-ordinates, the two systems having a common origin.

According to the invention such device is equipped with a gear coupling two cross-slide systems in such a way that by setting one system in accordance with the co-ordinates of a point with respect to one system of co-ordinates, the other system is set according to the co-ordinates of this point with respect to the other system of co-ordinates. The gear may be, e. g., a lever gear.

For the sake of simplicity the description only explains the transformation of co-ordinates of two-dimensional objects, but it has to be understood that transforming co-ordinates of three-dimensional objects is based on quite the same principles of solving the problem and offers no difficulties what ever.

A suitable form of execution of a device corresponding to the invention is obtained when two cross-slide systems, whereof each consists of two members, are coupled by means of a system of levers in such a manner that by setting the two slides of one cross-slide system according to the co-ordinates $X_1'$ and $Y_1'$ with respect to a system of rectangular co-ordinates (system $X_1'$, $Y_1'$) of a point lying in the plane which is determined by this system, the other system of cross-slides is imparted a displacement which allows of finding the co-ordinates $X_1$ and $Y_1$ of the said point with respect to another system of rectangular co-ordinates (system $X, Y$) which is turned by an angle $\alpha$ relatively to the system $X'$, $Y'$ in the plane of this system.

The problem has two solutions. One is arrived at when the directions of displacement of corresponding slides of the two systems of cross-slides are made parallel and when the system of levers is constructed in such a way that it comprises two levers coupled with each other for equal motion and arranged in such a manner that they permit of being adjusted according to the angle $\alpha$ of the mutual turning movement, included between the systems of co-ordinates, and being connected with an appliance for maintaining their efficacious lengths.

In order to arrive at the second solution, one system of cross-slides is so disposed that it may be turned about an axis perpendicular to the plane determined by the directions of displacement of the two slides of the other system of cross-slides, so that the directions of displacement of the two slides of the first system of cross-slides can be adjusted relatively to those of the respective slides of the said other system of cross-slides and in corresponding with the turning angle, $\alpha$, included between the two systems of co-ordinates ($X'$, $Y'$ and $X$, $Y$). In this case the lever system must be constructed in such a way that it has only one lever which turns also about the said axis.

Figure 3:
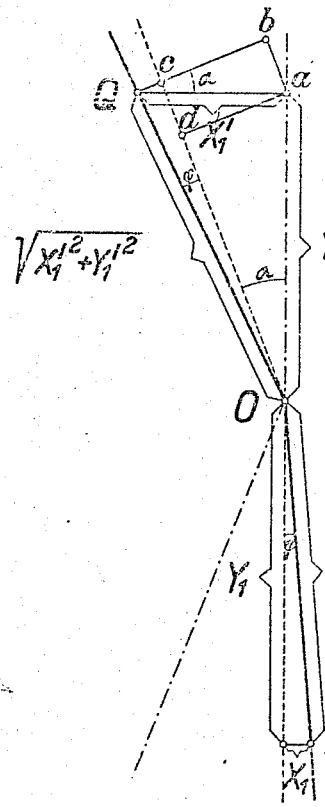
Figure 5:
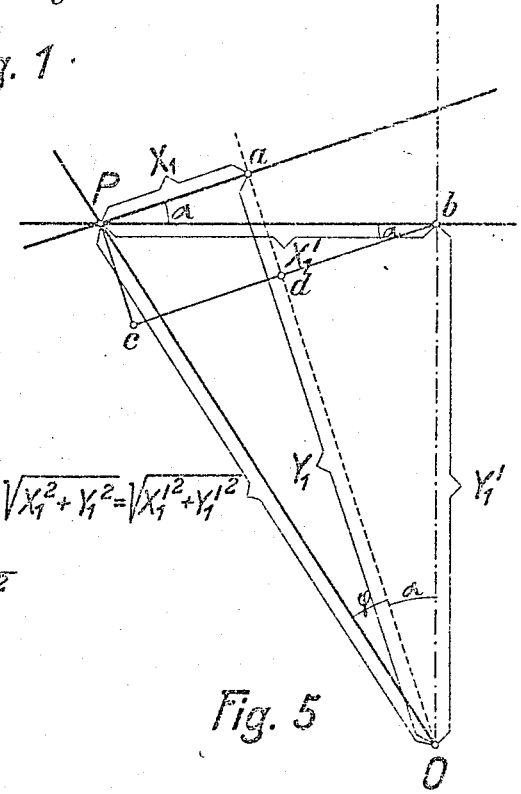
Figure 2:
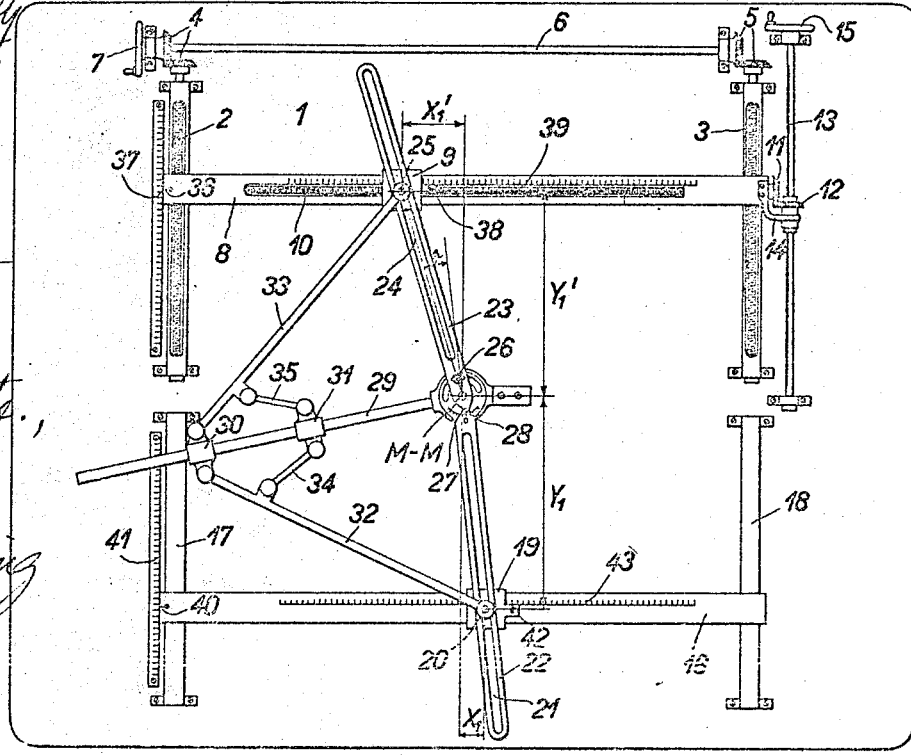
Figure 4:
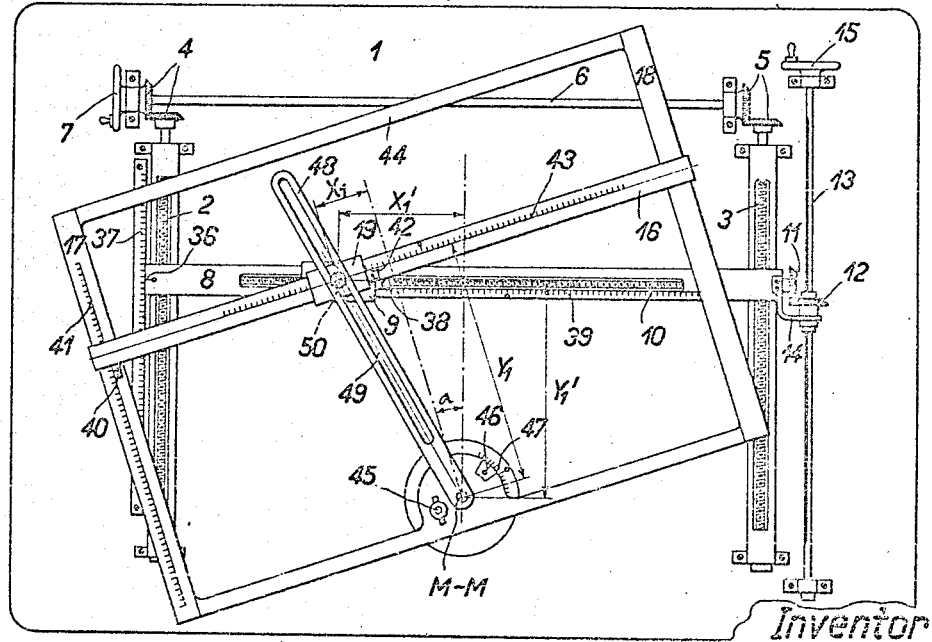

In the accompanying drawings the schematic Figures 1, 3, and 5 serve for explaining the invention, whereas the Figures 2 and 4 represent constructional examples of the invention in plan views.

Figure 1 shows two systems of rectangular co-ordinates with the axes $X$ and $Y$ and, respectively, $X'$ and $Y'$, having the same starting point $O$ and turned relatively to each other by an angle $\alpha$. Taking the reference letters designating the different parts of the drawings, the following equations are obtained for the co-ordinates $X_1$ and $Y_1$ and, respectively, $X_1'$ and $Y_1'$ of a point $P_1$.

(1) $X_1 = \overline{P_1h} - \overline{fh} = \overline{P_1h} - \overline{cg} = X_1' \cos\alpha - Y_1' \sin\alpha$
(2) $Y_1 = \overline{ef} + \overline{Oe} = \overline{gh} + \overline{Oe} = X_1' \sin\alpha + Y_1' \cos\alpha$
(3) $X_1' = \overline{Od} + \overline{bd} = \overline{Od} + \overline{ac} = X_1 \cos\alpha + Y_1 \sin\alpha$
(4) $Y_1' = \overline{P_1a} - \overline{ab} = \overline{P_1a} - \overline{cd} = Y_1 \cos\alpha - X_1 \sin\alpha$
(5) $OP_1 = \sqrt{X_1^2 + Y_1^2} = \sqrt{X_1'^2 + Y_1'^2}$.

A device (comprising two cross-slide systems and a gear) corresponding to the invention must be constructed in such a way that, when by means of the said gear one cross-slide system is adjusted in accordance with the co-ordinates of a point with respect to one of the two systems of co-ordinates, the other cross-slide system is imparted such an adjustment that the relations of the said equations always hold good.

In the first constructional example, which Figure 2 illustrates, 1 is a bed plate on which two parallel spindles, 2 and 3, having threads of the same pitch, are revolubly mounted. These two spindles are coupled with each other for equal rotation by means of two pairs of bevel wheels, 4 and 5, and a shaft 6 which can be rotated by a hand-wheel 7. By means of two nut-pieces (not represented in the drawings) the two spindles are connected with a slide 8 which is the lower slide of a system of two cross-slides whereof the other, upper, slide 9 is guided perpendicularly to the spindles 2 and 3 and allows of being moved along the slide 8 by means of a threaded spindle 10 with which it meshes through the agency of a nut-piece (not represented in the drawings). For rotating the spindle 10 there serves a bevel wheel 11 fixedly connected to it and meshing with a bevel wheel 12 which is revolubly mounted on the bed plate 1 in such a way that it slides along a grooved shaft 13 parallel to the spindles 2 and 3 and, through the agency of an arm 14 attached to the slide 8, contributes to displace this slide. The grooved shaft 13 can be rotated by means of a hand-wheel 15. Of another system also consisting of two cross-slides, the lower slide, 16, is displaceably disposed on two guide rods, 17 and 18, which are mounted on the bed plate 1 so as to be parallel to the spindles 2 and 3, whereas the upper slide, 19, is arranged on the slide 16 and displaceable perpendicularly to the said guide rods.

An arm 22 of a double lever which is mounted on the bed plate 1 so as to be rotatable about an axis M—M engages by means of a longitudinal slot 21 with a stud 20 of the slide 19, and the other arm, 23, of the said double lever engages by means of a longitudinal slot 24 with a stud 25 of the slide 9. The inclination of the arm 23 relatively to the arm 22 can be adjusted by means of turning the arm 23 about the axis M—M. A clamping screw 26 serves for fixing the arms relatively to each other. The angle $\alpha$ which the arm 23 and the imaginary elongation of the arm 22 enclose in each instance, is indicated on a graduation 28 of the arm 22 by means of an index 27 of the arm 23. On the bed plate 1 there is mounted for turning about the axis M—M also a guide rod 29 along which two sleeves, 30 and 31, can be moved. Two rods of equal length, 32 and 33, are each jointly connected with one end to the sleeve 30. The other ends of the rods 32 and 33 are revolubly connected with the studs 20 and 25, respectively. Two other rods of equal length, 34 and 35, are each jointly connected with one end to the sleeve 31, and the other ends of these two rods are jointly connected with the rods 32 and 33, respectively. Provision is made that the two studs 20 and 25 are equidistant from the axis M—M. An index 36 of the slide 8 indicates on a scale 37 of the bed plate 1 the component of the distance of the stud 25 from the axis M—M, parallel to the direction of displacement of the slide 8. That component of this distance parallel to the direction of displacement of the slide 9 is indicated on a scale 39 of the slide 8 by means of an index 38 of the slide 9. An index 40 of the slide 16 indicates on a scale 41 of the bed plate 1 that component of the distance of the stud 20 from the axis M—M parallel to the direction of displacement of the slide 16, whereas the component of this distance falling in the direction of displacement of the slide 19 is indicated on a scale 43 of the slide 16 by means of an index 42 of the slide 19.

When setting the slides 8 and 9 in correspondence with the co-ordinates $X_1'$ and $Y_1'$ of any point with respect to a system of rectangular co-ordinates, $X'$, $Y'$, the slides 16 and 19 are set to indicate on the scales 41 and 43 those co-ordinates, $X_1$ and $Y_1$, which the point has with respect to a system of rectangular co-ordinates, $X$, $Y$, turned relatively to the said system of co-ordinates, $X'$, $Y'$, by the angle $\alpha$ (according to which the mutual settings of the arms 22 and 23 of the double lever were made) and, consequently, there exist between the co-ordinates relations which are given by the aforementioned equations, as can be readily deduced from Figure 3 by means of which, when taking its reference letters, the following equations are arrived at.

$$tg\phi = \frac{X_1}{Y_1} = \frac{Qb-bc}{Od+cd} = \frac{Qb-ad}{Od+ab} = \frac{X_1}{Y_1'}\frac{\cos\alpha - Y_1'\sin\alpha}{\cos\alpha + X_1'\sin\alpha},$$

$$\sqrt{X_1^2+Y_1^2} = \sqrt{X_1'^2+Y_1'^2}.$$

The first of these two equations can be deduced at once from the Equations 1 and 2, given hereinbefore. The second equation is identical with Equation 5. It is evident that also the Equations 3 and 4, are arrived at.

The second constructional example, illustrated by Figure 4, in which, as far as possible, the reference letters of the first constructional example, illustrated by Figure 2, are applied, differs substantially from the first example only in the following. The guide rods 17 and 18 of the lower slide 16 of the cross-slide system 16, 19 are not fixed on the bed plate 1 but belong to a frame 44 which, relatively to the bed plate 1, can be turned about the axis M—M and can be set relatively to the bed plate 1 by means of a clamping screw 45. An index 46 of the frame 44 indicates on a graduation 47 of the bed plate 1 the angle $\alpha$ which the directions of displacement of the slides 8 and 16, and 9 and 19, respectively, include in each instance. Contrary to the first example, in which a system of levers is applied, the slides 9 and 19 are coupled with each other by means of one single lever 48 which turns about the axis M—M and engages by means of a slot 49 with a stud 50 of the slide 19. The slide 19 is mounted on the slide 9 and can be turned on a stud (not represented in the drawings) which belongs to the slide 9 and whose axis coincides with that of the stud 50.

When setting the slides 8 and 9 in correspondence with the co-ordinates $X_1'$ and $Y_1'$ of any point with respect to a system of rectangular co-ordinates, $X'$, $Y'$, the slides 16 and 19, in turn, are set in such a way that the values they indicate on the scales 41 and 43 represent those co-ordinates, $X_1$ and $Y_1$, which the point has with respect to a system of rectangular co-ordinates, $X$, $Y$, turned by the angle $\alpha$ (according to which the frame 44 is set relatively to the bed plate 1) relatively to the said system of co-ordinates. $X'$, $Y'$, and, consequently, there exist between the co-ordinates relations that are given by the aforementioned equations, as can be readily deduced from Figure 5 which, when taking its reference letters, gives the following equations:

$$tg\phi = \frac{X_1}{Y_1} = \frac{\overline{bc}-\overline{bd}}{\overline{Od}+\overline{ad}} = \frac{\overline{bc}-\overline{bd}}{\overline{Od}+\overline{Pc}} = \frac{X_1'\cos\alpha - Y_1'\sin\alpha}{Y_1'\cos\alpha + X_1'\sin\alpha},$$

$$\sqrt{X_1^2+Y_1^2} = \sqrt{X_1'^2+Y_1'^2}.$$

I claim:

1. A device for transforming co-ordinates, comprising a bed plate, two slides disposed displaceably relatively to this bed plate, two upper slides whereof one each is displaceably mounted on a respective one of the two first named slides for movement perpendicular to the direction of displacement of the appertaining first named slide, and means for connecting the two upper slides, these means, when one of the said first named slides and the slide which is mounted on it are set according to the co-ordinates of a point relatively to the one system of co-ordinates, being adapted to give the two other slides that adjustment which corresponds to the co-ordinates of the same point with respect to a system of co-ordinates turned by a certain angle with respect to the first system, the two systems having a common origin.

2. A device for transforming co-ordinates, comprising a bed plate, two lower slides displaceably disposed on this bed plate, two upper slides whereof one each is displaceably mounted on a respective one of the two lower slides for movement perpendicular to the direction of displacement of this lower slide, and a system of levers connecting the two upper slides and, when one of the said lower slides and the upper slide which is mounted on it are set according to the co-ordinates of a point relatively to the one system of co-ordinates, adapted to give the two other slides that adjustment which corresponds to the co-ordinates of the same point with respect to a system of co-ordinates turned by a certain angle with respect to the first system, the two systems having a common origin.

3. A device for transforming co-ordinates, comprising a bed plate, two lower slides displaceably disposed on this bed plate, two upper slides whereof one each is displaceably mounted on a respective one of the two lower slides for movement perpendicular to the direction of displacement of this lower slide, two levers mounted on the bed plate for rotation about a common axis, means for fixing the angular relation of the two levers, the two levers being pivotally and slidably connected to the two upper slides respectively, and means for maintaining the connection of said levers and slides an equal distance from the said common axis.

4. A device for transforming co-ordinates, comprising a bed plate, two lower slides displaceably disposed parallel to each other on the said bed plate, two upper slides whereof one each is displaceably mounted on a respective one of the two lower slides for movement perpendicular to the direction of displacement of this lower slide, two levers mounted on the bed plate for rotation about a common axis, means for fixing the angular relation of the two levers, the two levers being pivotally and slidably connected to the two upper slides respectively, and means for maintaining the connection of said levers and slides an equal distance from the said common axis.

5. A device for transforming co-ordinates, comprising a bed plate, a slide displaceably disposed on this bed plate, a second slide displaceably mounted on the first slide for movement perpendicular to the direction of displacement of the first slide, a slide guide revolubly mounted on the bed plate, a third slide displaceable along the said slide guide, a forth slide displaceably mounted on the third slide for movement perpendicular to the direction of displacement of the third slide, means for pivoting the fourth slide to the second slide, a lever revolubly disposed on the turning axis of the said slide guide and pivotally and slidably connected to the second and fourth slides, and means for maintaining the position of the said slide guide relatively to the bed plate.

WILLY SANDER.